UNITED STATES PATENT OFFICE.

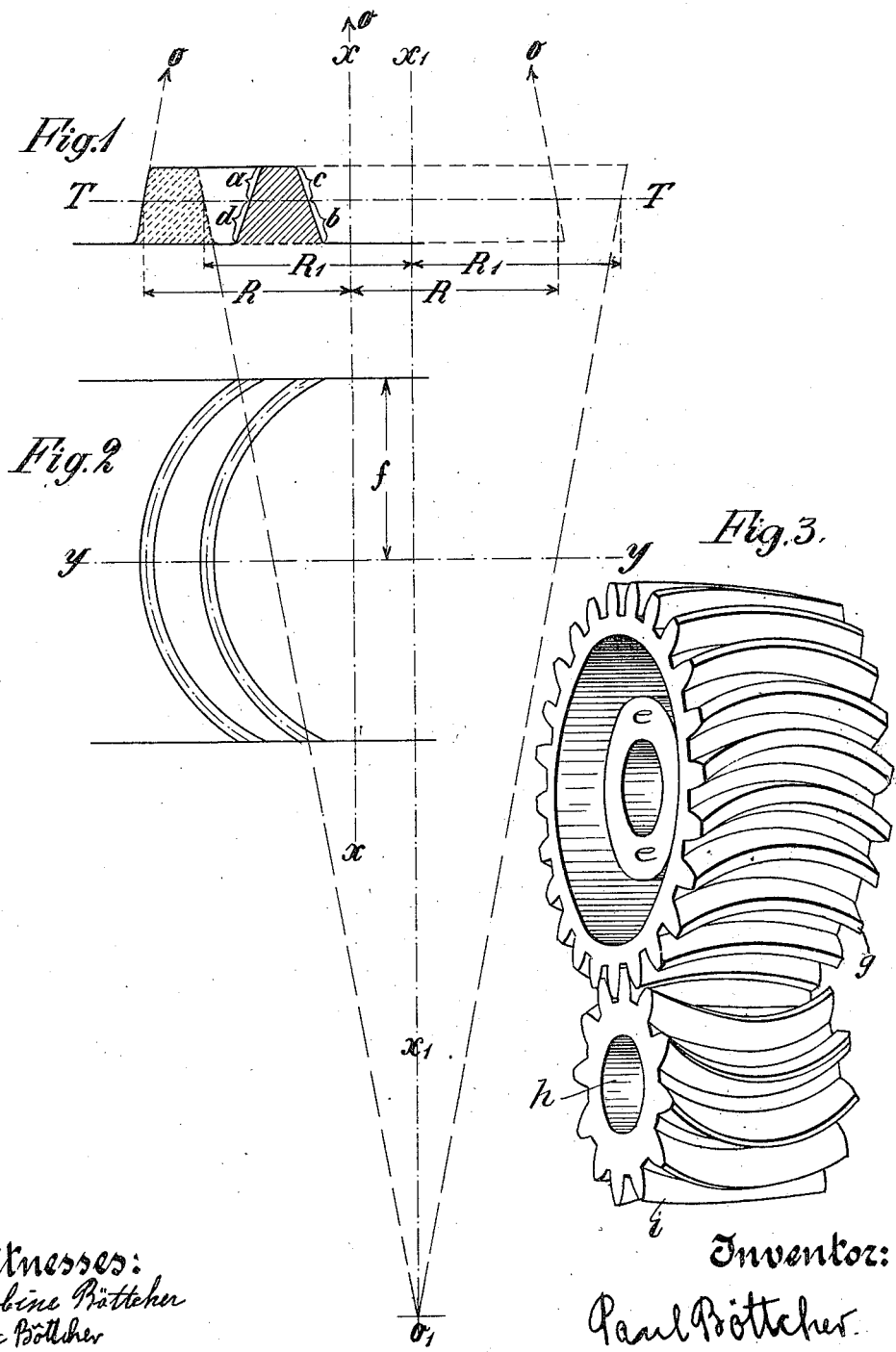

PAUL BÖTTCHER, OF GROSS FLOTTBECK, NEAR HAMBURG, GERMANY.

CURVED TEETH FOR GEARS.

1,154,840.  Specification of Letters Patent.  Patented Sept. 28, 1915.

Application filed February 3, 1913. Serial No. 746,029.

*To all whom it may concern:*

Be it known that I, PAUL BÖTTCHER, a subject of the German Emperor, and residing at 15 Theodor-Körner strasse, Gross Flottbeck, near Hamburg, Germany, have invented certain new and useful Improvements in Curved Teeth for Gears, of which the following is a specification.

Curved gear-teeth for wheels and pinions, the upper edges of which are arcs of curves of equal radius and having their centers in the same right line are known.

It is the object of the present invention to improve this type of teeth as more fully explained herebelow.

Every set of change gears has the shape of its teeth determined by the shape of the tooth of the respective rack, for theoretically the shape of the teeth is determined by determining from a given profile of a rack tooth the respective line of engagement from which then the profiles of the sides of all wheels of the set may be found, as the same is common to all.

In the known devices of this kind the face of the flank of the teeth is formed by cylindrical faces, while according to the present invention, these flank faces are formed by conical faces, a construction, which greatly increases the durability of the teeth and lowers the costs of manufacturing the rack bar as well as the pinions.

In the accompanying drawing:

Figure 1 is a diagrammatic view of two of the teeth of a rack or pinion according to the present invention. Fig. 2 is a plan view of the tooth. Fig. 3 is a perspective view of a pair of gear wheels provided with my improved gear teeth.

In Fig. 1 the sectional profile of the tooth in the middle plane through the width of the tooth $y$—$y$ is shown shaded by dotted lines, while the section shaded by full lines indicates the profile at the edge. As is further evident from Fig. 1 the tooth is curved in the plane indicated by the line T—T to the same radii R and $R_1$ for the concave and the convex sides respectively. The convex side presents the section of the shell of a hollow cone with the apex O and the axis X—X, while its concave side presents the corresponding section of a cone with the apex $O_1$ and the axis $X_1$—$X_1$. Both cones have the same diameter at the plane, indicated by the pitch line T—T, and are therefore according to Fig. 1 fully symmetrical to the pitch line T—T. From Fig. 1 it is further evident, that the side profiles for the central section, indicated by dotted lines, are composed of inclined straight lines, which coincide with the line producing the shell of the cone. The curve of the tooth for this section is thus a correct involute.

The shaded profile at the edge (Fig. 1) which according to Fig. 2 is taken at a distance $f$ from the center of the width of the tooth and thus also from the axis of the cone, is a section through a cone at a distance $f$ from the axis of the cone. Both sides will therefore appear as correspondingly inclined and curved branches of a hyperbola.

When several wheels with curved teeth mesh with one another the concave top of one tooth can only meet the convex foot of the other tooth of the other wheel and vice versa. If now congruent meshing lines are to be found for coöperating profiles, it will be sufficient for change gears with curved teeth, that the sections of the sides coöperating in pairs, have the same line of action in pairs, and that the meshing lines of all concave top sides of the whole set are similar to those of the convex sides of the foot and vice versa all convex top sides to those of the concave foot sides as shown in Fig. 3, a gear $c$ is provided with involute teeth $g$ and is meshing with a pinion $h$ with involute teeth $i$.

For the rack a symmetry of the meshing lines equivalent to the symmetry of the sides of the tooth is required, and it will be necessary for the rack of the set of change gears that the symmetry of the concave top side to the convex foot side and vice versa is a perfect one. Therefore in Fig. 1 the section of the hyperbola $a$ must be symmetrical to the section of the hyperbola $b$, and in the same manner $c$ to $d$, and this is also the case, as these profiles represent corresponding sections through cones lying similarly disposed to the pitch line T—T.

The shape of the tooth will therefore even in this end profile meet all requirements for change gears, the same as any other section made at any other point, notwithstanding the difference with regard to the involute, and work properly, but it will differ at each section according to the distance from the center of the width of the tooth.

The more the profile approaches the edge, the stronger it will be, as with a constant thickness of the tooth in the pitch circle the increasing angle of inclination of the sides toward the edge will also mean an increase of the thickness at the foot (Fig. 1).

A moderate inclination of the sides produces a very favorable shape of tooth, but owing to the undercutting very weak profiles. With a tooth according to the present invention the advantages of the different inclinations of the sides may be combined as the middle profile with the smaller inclination will work more favorably and will be supported by the thicker, not undercut end profile of the tooth which is very strong already by reason of its curved shape.

As further with every involute method the producing edge must envelop the tooth of an imaginary rack (or with bevel gears of a plane bevel gear,) and conical surfaces are as easily enveloped as the plane surfaces of prismatic bodies, the present invention at the same time produces a shape of tooth, the accurate machining of which (milling, grinding and polishing) after the latest methods will not offer any greater difficulties than heretofore in the case of straight teeth, notwithstanding the advantages of this new shape of tooth.

I claim:

Curved gear-teeth for racks and pinions comprising teeth with sides in form of sections of a conical shell surface, and forming at the convex and concave sides of the tooth conical surfaces, similarly disposed to the pitch line as of equal radii.

In testimony whereof I affix my signature in presence of two witnesses.

PAUL BÖTTCHER.

Witnesses:
 ERNST BÖTTCHER,
 ERNEST H. L. MUMMENHOFF.